(12) United States Patent
Catinchi

(10) Patent No.: US 9,290,194 B1
(45) Date of Patent: Mar. 22, 2016

(54) BAG HOLDER APPARATUS

(71) Applicant: Maria C. Catinchi, Charlotte, NC (US)

(72) Inventor: Maria C. Catinchi, Charlotte, NC (US)

(*) Notice: Subject to any disclaimer, the term of this patent is extended or adjusted under 35 U.S.C. 154(b) by 0 days.

(21) Appl. No.: 14/522,659

(22) Filed: Oct. 24, 2014

(51) Int. Cl.
*A63B 55/00* (2015.01)
*B62B 1/26* (2006.01)
*B65F 1/14* (2006.01)
*F16M 11/10* (2006.01)

(52) U.S. Cl.
CPC .............. *B62B 1/266* (2013.01); *B65F 1/1452* (2013.01); *F16M 11/10* (2013.01); *B62B 2202/22* (2013.01); *B65F 2240/138* (2013.01)

(58) Field of Classification Search
USPC ................................... 248/95, 97, 98, 99, 907
See application file for complete search history.

(56) References Cited

U.S. PATENT DOCUMENTS

| | | | |
|---|---|---|---|
| 85,511 A | 1/1869 | Crofoot | |
| 321,286 A * | 6/1885 | Earl | 248/98 |
| 362,807 A * | 5/1887 | Wing | 248/101 |
| 406,218 A * | 7/1889 | Jones | 248/98 |
| 546,117 A * | 9/1895 | Hitchings | 248/98 |
| 717,044 A * | 12/1902 | Steel | 248/98 |
| 769,625 A * | 9/1904 | Parks | 280/30 |
| 779,124 A * | 1/1905 | Haffey | 248/98 |
| 830,994 A * | 9/1906 | Hatin | 248/97 |
| 3,754,771 A | 8/1973 | Shagoury | |
| 3,893,699 A * | 7/1975 | Morris | 280/659 |
| 4,160,557 A * | 7/1979 | Taylor | 280/652 |
| 4,202,521 A * | 5/1980 | Harding | 248/98 |
| 4,304,378 A * | 12/1981 | Briggs | 248/97 |
| 4,452,468 A * | 6/1984 | Eads et al. | 280/641 |
| 4,759,519 A * | 7/1988 | Cheng | 248/99 |
| 4,856,740 A * | 8/1989 | MacLeod et al. | 248/97 |
| 4,917,393 A * | 4/1990 | Rogers | 280/47.28 |
| 4,927,104 A * | 5/1990 | Miller | 248/97 |
| 5,031,277 A | 7/1991 | Coker | |
| 5,069,405 A * | 12/1991 | Keating | 248/98 |
| 5,083,731 A | 1/1992 | Fullilove | |
| 5,183,009 A * | 2/1993 | Vito | 119/165 |
| 5,209,517 A * | 5/1993 | Shagoury | 280/654 |
| 5,445,398 A * | 8/1995 | Pierce | 280/47.26 |
| 5,456,431 A * | 10/1995 | Ilnisky | 248/98 |
| 5,971,410 A | 10/1999 | Nichols | |
| 6,003,894 A * | 12/1999 | Maher | 280/639 |
| 6,131,861 A * | 10/2000 | Fortier, Jr. et al. | 248/98 |
| 6,367,822 B1 * | 4/2002 | Hutchins | 280/47.24 |
| 6,382,573 B1 * | 5/2002 | Cepeda | 248/97 |
| 6,932,126 B1 * | 8/2005 | Spagnolo | 141/316 |
| 2005/0103950 A1 * | 5/2005 | Joubert | 248/98 |
| 2008/0309038 A1 | 12/2008 | Gilligan | |
| 2009/0032653 A1 * | 2/2009 | Gilligan et al. | 248/98 |
| 2010/0108826 A1 * | 5/2010 | Fernandez et al. | 248/98 |

* cited by examiner

*Primary Examiner* — Bradley Duckworth
(74) *Attorney, Agent, or Firm* — Everman Law Firm, P.A.; Gregory R. Everman

(57) ABSTRACT

A lawn bag holder apparatus capable of holding a bag in a laid-down horizontal position for racking or sweeping debris directly into the bag and in an upright position to settle debris further into the bag and tie the bag closed. The bag holder apparatus includes a base; a plurality of wheels attached to base; a platform pivotally attached to the base and moveable relative to the base between an upright position and a laid down position; a lift mechanism capable of supporting the platform in the upright position; and a hoop attachable to the platform for holding a bag.

11 Claims, 4 Drawing Sheets

BAG HOLDER APPARATUS

BACKGROUND OF THE INVENTION

1. Field of the Invention

The present invention relates to the field of trash and lawn bag holders and, more specifically, to trash and lawn bag holder capable of holding a bag in a laid-down horizontal position for racking or sweeping debris directly into the bag and in an upright position to settle debris further into the bag and tie the bag closed.

2. Description of the Related Art

Yard waste removal is a common task for homeowners. Leaves are racked into one or more piles. A person then opens a plastic yard waste collection bag and, while attempting to hold the bag open, hand scoop the leaves into the bag. As the bags are flimsy, they do not hold themselves open nor maintain their volume available for placement of yard waste. Thusly, it is a difficult and trying task for one person to bag yard waste. Due to this difficulty, it is preferably to have the assistance of a second person, one person to hold open the bag and the other to pick up yard waste and deposit it therein. However, oftentimes a second person is not available leaving the homeowner with this slow and tedious task. It is also difficult to fully fill a collection bag with yard waste, particularly without the aid of a second person.

The repeated motion of bending over to hold open a collection bag and scooping yard waste therein is difficult for many people, particularly those in poor health, with back or knee indications, or the elderly. Transport of a bag full of yard waste to a compost pile or street for pick-up may also be difficult for such persons as well. Commonly, a bag is dragged along the ground to their intended destination, subjecting the bag to risk of rupture.

Accordingly, there is a need in the art for a trash and lawn bag holder capable of holding open a collection bag in a laid-down, horizontal position and in a vertical position. There is also a need in the art for a trash and lawn bag holder configured to allow debris to be raked or swept directly into a bag. There is a further need in the art for a trash and lawn bag holder adapted to hold a bag in an upright position to settle debris or allow a person to compress debris further into the bag. Further, there is a need for a trash and lawn bag holder, easily movable by a person, while carrying a debris filled bag.

BRIEF SUMMARY OF THE INVENTION

To achieve the foregoing and other objects, the present invention, as embodied and broadly described herein, provides various embodiments trash and lawn bag holder apparatus for aiding a person in the collection of yard waste and debris.

In an embodiment, the invention is a lawn bag holder apparatus having a base, a plurality of wheels attached to base, a platform pivotally attached to the base and moveable relative to the base between an upright position and a laid down position, a lift mechanism capable of supporting the platform in the upright position, and a hoop attachable to the platform for holding a bag. In an embodiment, the platform includes a distal end portion and the hoop is attached to the distal end portion and wherein the hoop and distal end portion form a rim adapted for holding open a bag. Preferably, the hoop is adjustable in length. In an aspect of the invention, the hoop includes a first tab disposable within a first slot of the distal end portion for supporting the hoop in a position generally perpendicular to the platform. In another aspect, the first tab is moveable, from a first location to a second location, within the first slot whereby the hoop is adjustable in length and the first tab is releaseably lockable at the first location and at the second location. In yet another aspect, the lateral span of the hoop is adjustable by moving the first tab from the first location to the second location. In another aspect, twisting of the first tab is resisted by interior walls that define the first slot. In a further aspect, the hoop includes first and second tabs disposable within respective first and second slots of the distal end portion for supporting the hoop in a position generally perpendicular to the platform. And still further, in a aspect of the invention the hoop includes an intermediate portion, a left side portion and a right side portion, wherein the intermediate portion is adjustable relative to the left side portion and/or right side portion whereby the length of the hoop is adjustable such that the perpendicular span of the hoop is adjustable.

In an embodiment, the invention is a lawn bag holder apparatus having a base, a plurality of wheels attached to base, a platform pivotally attached to the base and moveable relative to the base between an upright position and a laid down position, a lift mechanism capable of supporting the platform in the upright position, and a hoop attachable to the platform for holding a bag, wherein the lift mechanism is adapted for moving the platform between a laid down position and an upright position and includes a first pneumatic cylinder having a first end portion attached to the base and a second end portion engaged with the platform. Optionally, the first pneumatic cylinder is a multi-stage telescoping cylinder. In an aspect of the invention, the first end portion of the first pneumatic cylinder is pivotally attached to the base and the second end portion of the first pneumatic cylinder slidably engages the platform when the platform moves between the laid down position and the upright position. In another aspect, the base includes a channel and the first end portion is disposed within the channel. Preferably, a majority of the first pneumatic cylinder is disposed within the channel when the platform is in the laid down position. In an aspect of the invention, the second end portion is disposed within a channel of the platform and the second end portion slidably engages with the platform when the platform moves between the laid down position and the upright position. In another aspect, the channel has laterally opposed lips for maintaining the second end portion within the channel. In still another aspect, the lift mechanism includes a second pneumatic cylinder having a first end portion attached to the base and a second end portion engaged with the platform. In yet another aspect, the second pneumatic cylinder has a shorter stroke than that of the first pneumatic cylinder. Optionally, the first pneumatic cylinder and/or second pneumatic cylinder is a multi-stage telescoping cylinder. In an embodiment of the invention, the first end portion of the first pneumatic cylinder and the first end portion of the second pneumatic cylinder are disposed within a channel of the platform and/or the second end portion of the first pneumatic cylinder and the second end portion of the second pneumatic cylinder are slidably engaged within a channel of the platform when the platform moves between an upright position and a laid down position.

Other aspects, objects, features and advantages of the invention will be made apparent or will be readily understood and appreciated by those skilled in the related art as the invention is described in greater detail hereinafter and is shown in the accompanying drawing figures. It is envisioned that all such aspects, objects, features and advantages of the invention as shown and described herein will be within the intended broad scope of the appended claims. The above and other aspects, objects, features and advantages may be accomplished by any of the exemplary embodiments of the invention described herein and illustrated in the accompanying drawings. However, it should be appreciated that the drawing figures are for illustrative purposes only, and that many modifications, changes, revisions and substitutions may be made to the exemplary embodiments illustrated herein without departing from the broadest reasonable interpretation of the appended claims.

BRIEF DESCRIPTION OF THE DRAWINGS

The above described and other features, aspects, and advantages of the invention are better understood when the following detailed description of the invention is read with reference to the accompanying drawings.

DESCRIPTION OF THE PREFERRED EMBODIMENTS

Figure 1:
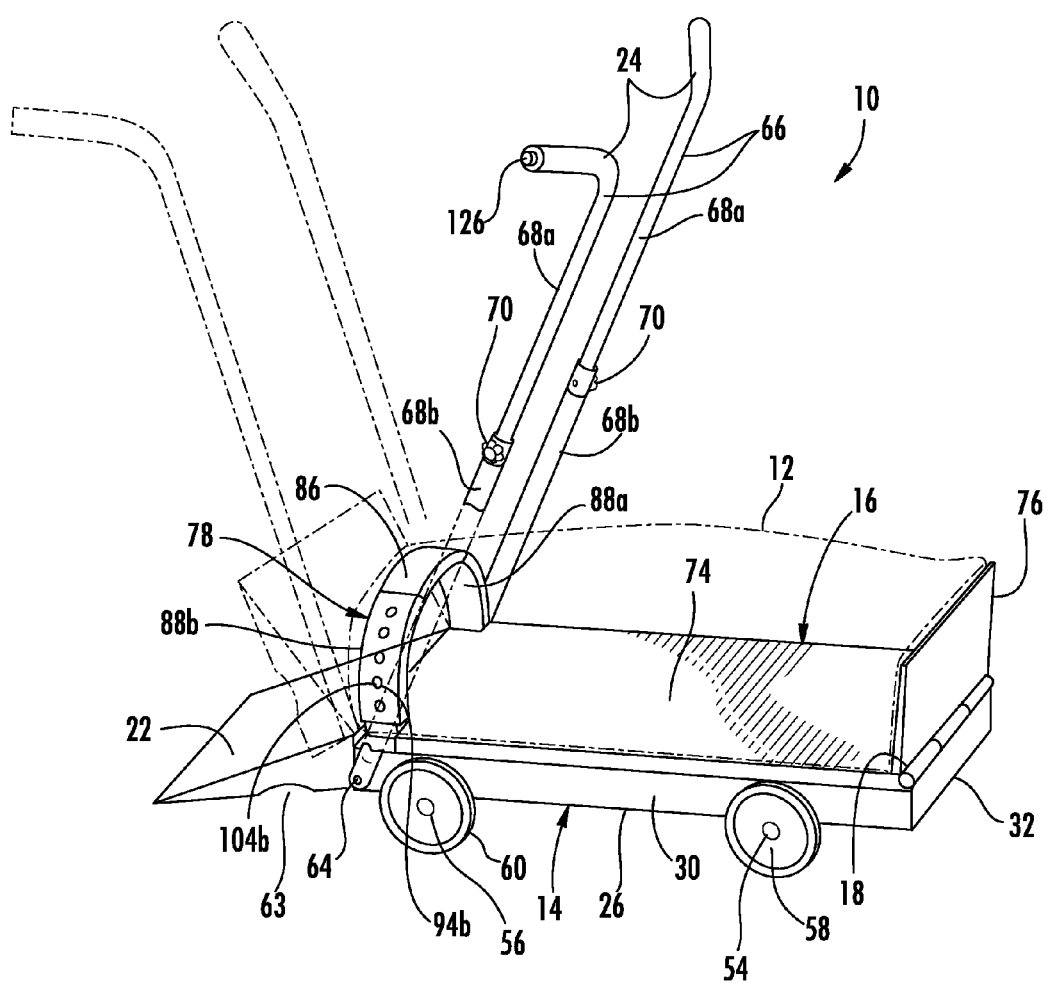
FIG. 1 is a top, right, perspective view of a trash and lawn bag holder apparatus, holding open a yard waste collection bag (illustrated in stipple) in a laid down, horizontal position for racking or sweeping debris directly into the collection bag, in accordance with an embodiment of the present invention.

The present invention will now be described more fully hereinafter with reference to the accompanying drawings in which preferred embodiments of the invention are shown. This invention may, however, be embodied in many different forms and should not be considered as limited to the embodiments set forth herein. These exemplary embodiments are provided so that this disclosure will be both thorough and complete, and will fully convey the scope of the invention to those skilled in the art. Throughout the several views of the drawings, like reference characters designate the same or similar parts.

Figure 2:
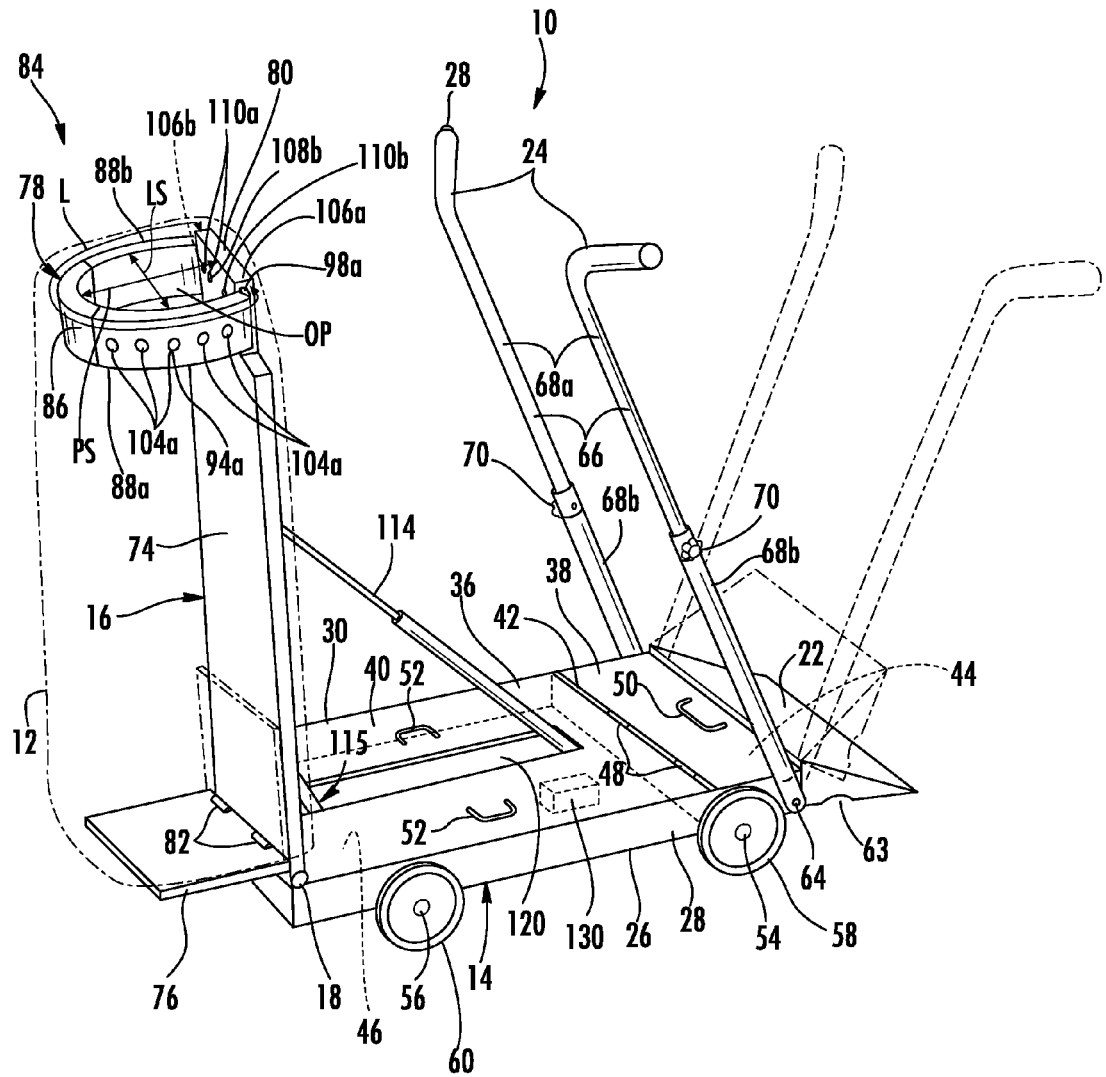
FIG. 2 is a top, left, perspective view of the lawn bag holder apparatus of FIG. 1, deployed in an upright position for initially applying a collection bag (illustrated in stipple) on the holder apparatus, compacting debris within the bag, and securing the bag closed.
Figure 3:
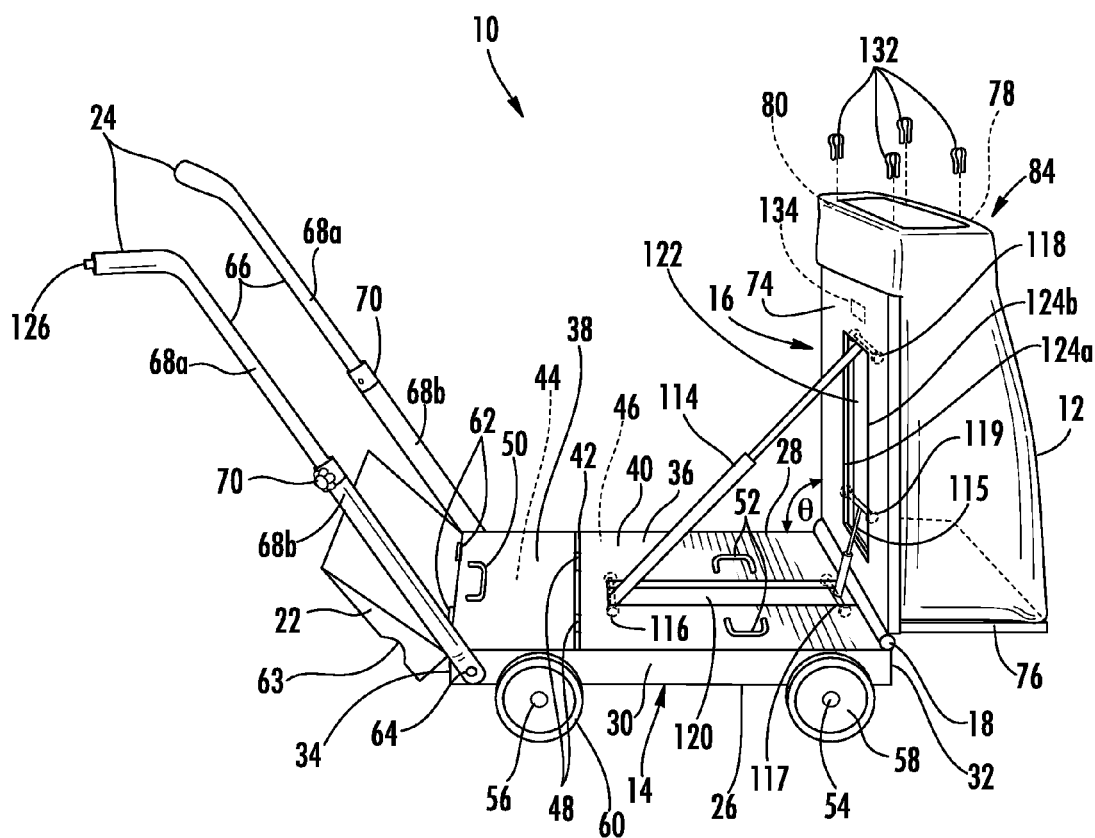
FIG. 3 is top, left perspective view of the lawn bag holder apparatus of FIG. 2.

Referring to FIGS. 1-3, a trash and lawn bag holder apparatus 10 is illustrated in accordance with an embodiment of the present invention. The bag holder apparatus 10 is capable being positioned in a laid down, generally horizontal position (FIG. 1) whereat it is adapted for holding open a collection bag 12 for raking or sweeping debris directly into the bag 12; and also in an upright, generally vertical position (FIGS. 2 and 3) whereat a bag 12 may be applied to the apparatus 10, a person may compact debris further into the bag 12, and a person may secure the bag 12 closed.

The holder apparatus 10 includes a base 14, a platform 16 pivotally attached to the base 14 by a hinge 18, a control system for rotating the platform 16 relative to the base 14 between the laid down position and an upright position, a rear ramp 22 and a handle 24 to aid a person in moving the holder apparatus 10 to a new location.

Referring to FIGS. 2 and 3, the base 14 is generally shaped rectangular or as a cuboid, having a bottom wall 26, left and right side walls 28, 30, front and rear walls 32, 34 and a top wall 36 comprised of first and second covers 38, 40. A lateral wall 42 partitions the base 14 into two chambers 44, 46, the first chamber 44 for storage of accessory items such as extra bags, gloves and the like and the second chamber 46 for housing components of the control system. The base 14 is made of plastic, metal or other material having suitable strength, rigidity and durability for the intended purpose.

The first cover 38 is pivotally attached to the lateral wall 42 by a hinge 48 to allow access to the first chamber 44. A handle 50 is provided to aid in the opening and closing of the first cover 38. The first cover 38 may rest upon the side and rear walls 28, 30, 34 of the base 14. Alternatively (not illustrated), side and rear walls may depend downward from the perimeter of the first cover 38 and rest upon the bottom wall 26 of the base 14.

Walls (not illustrated) depend downward from the perimeter of the second cover 40 and rest upon the bottom wall 26 of the base 14 such that the second cover 40 is nested within the left, right, front and lateral walls 28, 30, 32, 42 of the base 14. One or more handle 52 is provided to allow the second cover 40 to be lifted off of the bottom wall 26 to access components of the control system.

Front and rear axles 54, 56 are attached to the base 14 and carry respective front and rear wheels 58, 60 for facilitating transport of the holder apparatus 10.

Referring to FIG. 3, the rear ramp 22 is pivotally attached to the base 14 by a self-locking hinge 62. The hinge 62 allows the rear ramp 22 to be moved between a first position (illustrated in FIGS. 1 and 2) whereat the ramp 22 rests on top of the ground for racking or sweeping debris into the bag 12 and a second position (shown in stippled lines in FIGS. 1 and 2) whereat the ramp 22 is held by the self-locking hinge 62 above the ground, e.g. angled at least 45 degrees, more preferably at least 60 degrees, upwards from the base 14 to ease moving the holder apparatus 10 along the ground. The locking force of the hinge 62 can be manually overcome, e.g. by pressing downward on the ramp 22 with one's foot in order to reposition the ramp 22 from the second position to the first position. The ramp 22 can also be manually lifted from the down, first position to the up, second position by a person. Optionally, a cavity 63 may be provided in the rear ramp 22 for lifting of the ramp 22 by a person's foot. The ramp 22 is made of plastic, metal or other material having suitable strength, rigidity and durability for the intended purpose.

The handle 24 is pivotally attached to the base 14 by a pair of hinges 64. The handle 24 includes a pair of elongate arms 66 which can be forwardly positioned for better accessibility when raking debris into the bag 12 and rearwardly positioned (shown in stippled lines in FIGS. 1 and 2) for maneuvering the holder apparatus 10. Ideally, the hinges 64 are self locking or lockable when rearwardly positioned so that the handle 24 is fixed relative to the base 14 for pushing the bag holder apparatus 10. The self locking hinges 64 can be released in order to forwardly rotate the handle 24. Optionally, the handle 24 may be configured with an upper lateral member (not illustrated) joining the pair of arms 66 to provide an enlarged gripping area for maneuvering the apparatus 10. Also optionally, the handle 24 may be configured to be removable from the hinges 64 for shipping and storage purposes. Alternatively, the handle 24 may be affixed, instead of being pivotally attached, to the base 14. The handle 24 is made of plastic, metal or other material having suitable strength, rigidity and durability for the intended purpose.

Preferably, the handle arms 66 are adjustable in length. For example and not to be construed as limiting, each arm 66 may include telescoping first and second sections 68a, 68b, and a knobbed set screw 70 threaded through an opening in the first section 68a and engaging the second section 68b to releaseably fix the first and second sections 68a, 68b relative to each other. It is contemplated that there are other known and suitable ways in which the length of the arms 66 may be adjusted.

The platform 16 includes a generally rectangular or cuboid shaped body 74 sized to substantially cover the base 14 when in the laid down position, a front plate 76 capable of being oriented generally perpendicular to the body 74 and a hoop 78 for holding open and securing the bag 12 to the holder apparatus 10. The platform 16 is made of plastic, metal or other material having suitable strength, rigidity and durability for the intended purpose.

The body 74 has a length that is suitable for holding upright a conventional collection bag 12 such as, for example, from 2½ feet to 4½ feet, and a width suitable for supporting a collection bag 12 rested thereupon when in the laid down position such as, for example, from 2 feet to 3 feet. Thusly, the body 74 properly supports the collection bag 12 in an upright position for compacting debris therein and also provides a suitable surface area upon which the bag 12 rests while in the laid down position for raking debris into the bag 12.

The body 74 has a distal end portion 80 and is pivotally attached at its proximal end to the base 14 by hinge 18. Optionally, the distal end portion 80 may be configured as a narrowed neck portion, as illustrated, to accommodate a boarder range of lateral adjustment of the hoop 78.

The hinge 18 allows for the platform 16 to be rotated between the laid down position (wherein an angle θ between the longitudinal axis of the base 14 and longitudinal axis of the platform 16 is less than 25 degrees, more preferably less than 15 degrees and most preferably less than 5 degrees) and an upright position (i.e. wherein as when the angle θ between the longitudinal axis of the base 14 and longitudinal axis of the platform 16 is in a range of 25 degrees to 110 degrees, more preferably in a range of 60 degrees to 100 degree, and most preferably in a range of 70 degrees to 100 degrees.

The front plate 76 is pivotally attached via a hinge 82 to the body 74 such that it can be selectively moved to a closed position (shown in stipple in FIG. 2) in which the front plate 76 rests against the body 74 for purpose of storage and an open position in which the front plate 76 is generally perpendicular to the body 74. When in the open position, the collection bag 12 rests on the front plate 76 in addition to being supported by the hoop 78. As such, the front plate 76 offsets a portion of the weight of the collection bag 12 (and debris therein) being held by the hoop 78. The front plate 76 is made of plastic, metal or other material having suitable strength, rigidity and durability for the intended purpose.

Referring to FIG. 2, the hoop 78 in combination with the distal end portion 80 (collectively "rim" 84), support and hold open the collection bag 12. In a preferred embodiment, the hoop 78 is adjustable in length (L) such that the perimeter distance of the rim 84 may be made longer or shorter. As used herein the length (L) of the hoop 78 is the length (L) of the hoop 78 that is external of the distal end portion 80. In this fashion, adjustment of the hoop 78 accommodates collection bags 12 of different sized openings. The hoop 78 is made of plastic, metal or other material having suitable strength, rigidity and durability for the intended purpose.

Figure 4:
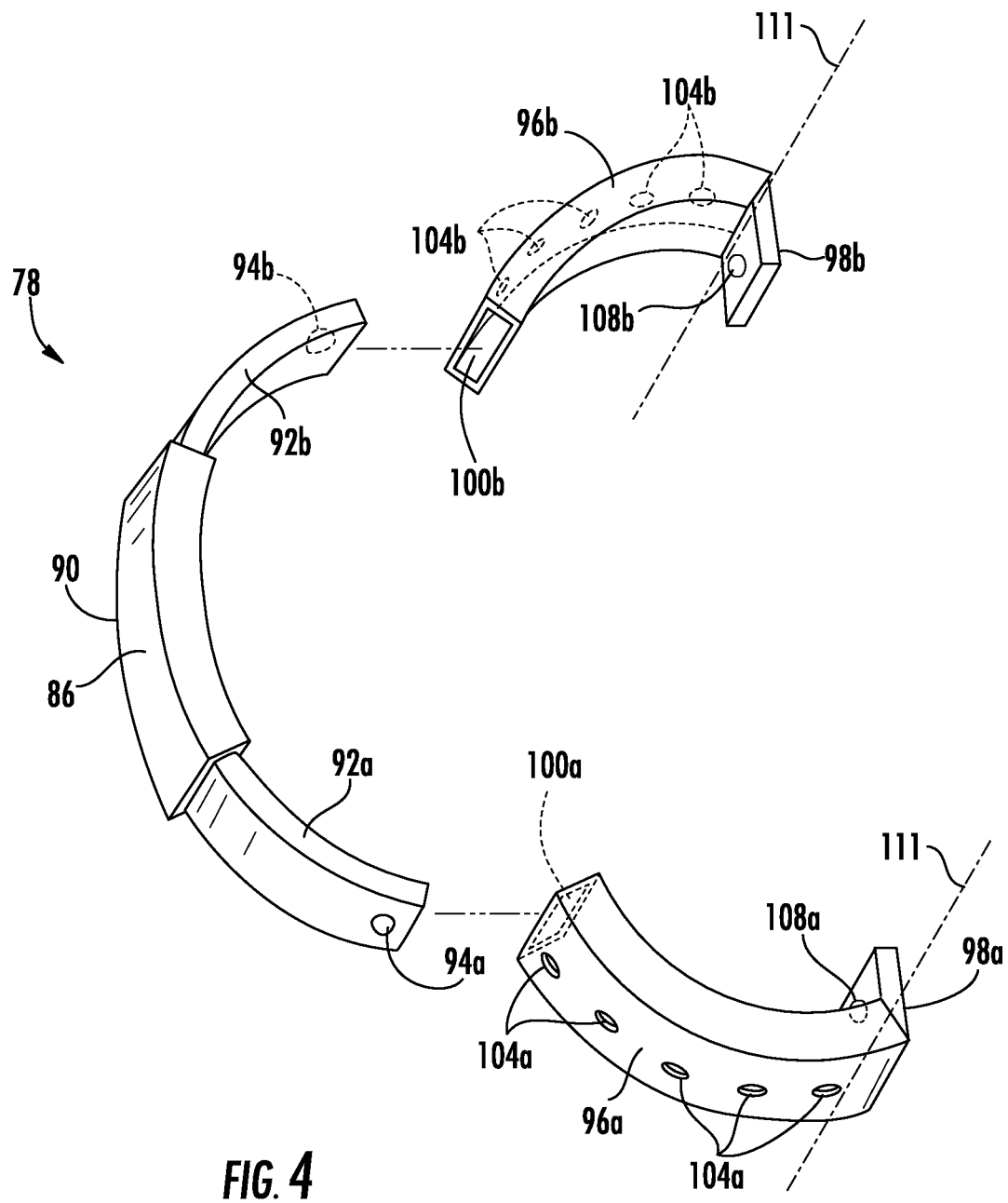
FIG. 4 is an exploded perspective view of an adjustable hoop suitable for use with the lawn bag holder apparatus of FIG. 1, the hoop capable of holding open a collection bag (not illustrated).

Referring to FIG. 4, in an exemplary embodiment, the hoop 78 includes an intermediate portion 86, a left side portion 88a and a right side portion 88b which is a mirror image of the left side portion 88a. The intermediate portion 86 includes an intermediate section 90 and opposed tabs 92a, 92b extending therefrom. Each tab 92a, 92b is provided with a releasable locking means, for example and without limitation spring lock retaining pins 94a, 94b, for releaseably securing the left and right side portions 88a, 88b, respectively.

Each of the left and right side portions 88a, 88b include a body 96a, 96b and a tab 98a, 98b extending therefrom. The left and right portions 88a, 88b each include a longitudinal channel 100a, 100b accessible through an open end. A series of apertures 104a, 104b are formed through a wall (such as an outwardly facing wall as illustrated or an inwardly facing wall) of the side portions 88a, 88b to the respective channel 100a, 100b. The channels 100a, 100b are adapted to receive respective tabs 92a, 92b of the intermediate portion 86. In particular, by depressing spring-loaded retaining pins 94a, 94b the tabs 92a, 92b may be inserted into respective channels 100a, 100b. Upon alignment with corresponding apertures 104a, 104b, the retaining pins 94a, 94b are urged under the force of the springs to extend through the apertures 104a, 104b thereby releasably securing the intermediate portion 86 to the left and right portions 88a, 88b.

To adjust the length (L) of the hoop 78, a different connection point between the intermediate portion 86 and the left portion 88a and/or right portion 88b may alternatively be selected. For example, the left portion 88a may be adjusted relative to the intermediate portion 86 by depressing the spring-loaded retaining pin 94a and moving left portion 88a such that the retaining pin 94a is aligned and received within a different aperture 104a. Likewise, right portion 88b may be adjusted relative to the intermediate portion 86 by depressing the spring-loaded retaining pin 94b and moving right portion 88b such that the retaining pin 94b is aligned and received within a different aperture 104b. In this manner not only may the length (L) of the hoop 78 be adjusted but also the perpendicular span (PS) of the hoop 78, which is defined herein as the greatest distance between the distal end portion 80 and hoop 78. Thusly, the opening (OP) of the collection bag 12 may be adjusted not only to accommodate bags of different diameters, but also to adjust the amount that the bag opening (OP) is held open for raking debris into the bag 12 when in the laid down position (see FIG. 1) and compressing debris into the bag 12 when in the upright position (FIGS. 2 and 3).

Referring collectively to FIGS. 2 and 4, tabs 98a,98b of the left and right side portions 88a, 88b are adapted to be received within respective first and second slots 106a, 106b (FIG. 2) provided within the distal end portion 80 (FIG. 2) of the platform 16. Each of the tabs 98a, 98b are provided with releasable locking means, for example and without limitation a spring lock retaining pin 108a, 108b. Upon depressing the retaining pins 108a, 108b, the tabs 98a, 98b may be asserted within the respective slots 106a, 106b. When the pins 108a, 108b reach corresponding apertures 110a, 110b (FIG. 2) provided in the distal end portion 80, the retaining pins 108a, 108b are urged under the force of the springs to extend through the apertures 110a, 110b thereby releasably attaching the left and right side portions 88a, 88b to the platform 16. Preferably, there is minimal clearance such that the tabs 98a, 98b are snuggly disposed within the first and second slots 106a, 106b. As such turning and twisting of the tabs 98a, 98b is resisted by interior walls (e.g. forward and rearward walls relative to the tabs 98a, 98b from the view point of when the platform 16 is in an upright position of 90 degrees) defining the slots 106a, 106b, thereby supporting the hoop 78 in a position generally perpendicular to the platform 16 against weight of a filled collection bag 12 (FIG. 3).

Selectability of connection points between the distal end portion 80 and left side portion 88a and/or right side portion 88b allows for the length (L) and lateral span (LS) of the hoop 78 and thusly the rim 84 (FIG. 2) to be adjusted. (As used herein the lateral span (LS) is the greatest lateral distance across an opening (OP) defined by the hoop 78). For example, the left portion 88a may be adjusted relative to the distal end portion 80 by depressing the spring-loaded retaining pin 108a and moving left portion 88a such that the retaining pin 108a is aligned and received within a different aperture 110a (only one aperture is shown in FIG. 2, notwithstanding it is to be understood that a plurality of apertures 110a may be provided). Likewise, right portion 88b may be adjusted relative to the distal end portion 80 by depressing the spring-loaded retaining pin 108b and moving the right portion 88b such that the retaining pin 108b is aligned and received within a different aperture 110b (FIG. 2). Thusly, one or both of the tabs 98a, 98b may be moved from a first location to a second location within respective slots 106a, 106b to adjust the length (L) of the hoop 78. To accommodate length (L) adjustment of the hoop 78, preferably the tabs 98a, 98b or transition between the tabs 98a, 98b and distal end portion 80 are semi-flexible such that they may act as hinges thereby allowing some relative rotation (about an axis 111), e.g. less than 20 degrees, between the tab 98a and body 96a of the left side portion 88a, and between the tab 98b and body 96b of the right side portion 88b.

Preferably the hoop 78 is generally semi-circular and, in combination with the distal end portion 80, forms the rim 84 generally having a D-shape. Notwithstanding, it is within the scope of the present invention that the rim 84 may be configured in any variety of shapes such as for example square, rectangular, circular and oval.

It is within the scope of the present invention that the hoop 78 may be configured with more or less component parts. For example, the hoop 78 may be configured with two portions (e.g. intermediate portion 86 and right side portion 88b are configured as one-piece which is adjustable relative to the left side portion 88a). As another example, the hoop 78 may be non-adjustable wherein the intermediate portion 86, left side portion 88a and right side portion 88b are one piece. It is also within the scope of the present invention that other releasable locking means may be used instead of the spring lock retaining pins 94a, 94b, 108a, 108b, such as for example fasteners, set screws, clips and the like. It is further contemplated that the hoop 78 may be affixed to the platform 16, and/or may also be attached to the exterior surface (instead of within the slots 106a, 106b) of the platform 16.

Referring to FIG. 3, a lift mechanism is provided to move the platform 16 between the laid down position (FIG. 1) and upright position and to support the platform 16 in the upright position. In a preferred embodiment, the lift mechanism is a pneumatic cylinder 114 having a first end portion 116 pivotally attached to the base 14 and a second end 118 slidably engaged with the platform 16. As used herein, the term "pneumatic cylinder" is inclusive of pneumatic and hydraulic cylinders. In an exemplary embodiment, the base 14 includes a longitudinal channel 120 sized to at least partially house the pneumatic cylinder 114 when the platform 16 is in the laid down position. The first end portion 116 of the pneumatic cylinder 114 is pivotally mounted to the bottom wall 26 of the base 14. The platform 16 includes a longitudinal channel 122 having laterally opposed left longitudinal lip 124a and right longitudinal lip 124b in which the second end portion 118 slides and is maintained. By having the first end portion 116 attached within the channel 120 of the base 14 and the second end portion 118 engaged within the channel 122 of the platform 16, the pneumatic cylinder 114 is orientated at an upward angle inclined from the base 14 to the platform 16 regardless of whether the platform 16 in the laid down or upright position. Preferably, a majority of the pneumatic cylinder 114 is disposed within the channel 122 of the platform 16 when in the laid down position thereby allowing a lower profile. More preferably, at least 80 percent of the pneumatic cylinder 114 is disposed within channels 120, 122, collectively, when the platform 16 is in the laid down positions.

Optionally, the lift mechanism may include more than one pneumatic cylinder 114. In an exemplary embodiment, two pneumatic cylinders 114, 115 may be used as shown. The second pneumatic cylinder 115 has a first end portion 117 pivotally attached within the longitudinal channel 120 to the base 14 and a second end portion 119 slidably engaged within the longitudinal channel 122 with the platform 16 in a manner similar to that of the first pneumatic cylinder 114. The second pneumatic cylinder 115, being shorter than the first pneumatic cylinder 114, may provide or assist in providing initial lift of the platform 16 whereafter first pneumatic cylinder 114 completes the lift to the upright position. That is, the pneumatic cylinders 114, 115 may operate in stages wherein the second pneumatic cylinder 115 begins lifting the platform and the second pneumatic cylinder 114 completes the process, or the pneumatics cylinders 114, 115 may lift simultaneously, or in some other combination. As such, the stoke of the second pneumatic cylinder 115 is shorter than that of the pneumatic cylinder 114. Preferably, a majority of the pneumatic cylinders 114, 115 are disposed within the channel 122 of the platform 16 when in the laid down position thereby allowing a lower profile. More preferably, at least 80 percent of the pneumatic cylinders 114, 115 is disposed within channels 120, 122, collectively, when the platform 16 is in the laid down positions.

It is within the scope of the present invention that the number, type, means of attachment and arrangement of pneumatic cylinders may differ from preferred embodiments described herein. For example, one or more multi-stage telescopic pneumatic cylinders may be used; engagement between a pneumatic cylinder 114, 115 and platform 16 may be pivotable instead of slidable; attachment between a pneumatic cylinder 114, 115 and the base 14 may be fixed instead of pivotable; a pneumatic cylinder 114, 115 may be attached at the surface of the base 14 or platform 16 instead of within the channels 120, 122; and other variations.

In a less preferred embodiment, the lift mechanism does not move the platform 16 but instead only supports it at a position. For example, a person manually lifts the platform 16 to an upright position whereat the lift mechanism supports it at that position. The locking aspect of the lift mechanism is releaseable whereby the person can manually lower the platform 16 to the laid down position. In such an embodiment, the lift mechanism may be a self-locking hinges, self-locking telescoping shafts, or the like.

Actuation of the pneumatic cylinders 114, 115 is controlled by the control system. The control system includes a switch, for example a toggle switch 126 located on the handle 24, to power on to extend or retract the pneumatic cylinder 114, 115 and a power source such as a battery 130. Wiring connecting components of the control system and the pneumatic cylinder 114, 115 is conventional and thusly not illustrated.

In operation, the switch 126 is toggled to an up position to advance the platform 16 under force of one or more pneumatic cylinders 114, 115 towards the upright position. The hoop 78 is adjusted in length (L) as necessary to correspond to the diameter of the collection bag 12, and the front plate 76 is rotated to the open position perpendicular to the platform 16. The collection bag 12 is positioned onto the rim 84 and secured with clips 132, bungee cord (not illustrated), or other suitable means.

The switch 126 is then toggled to the laid down position whereby the pneumatic cylinders 114, 115 retract lowering the platform 16 to the laid down position. The handle 24 is located to the rearward position and the bag holder apparatus 10 maneuvered to a desired location whereupon the handle 24 is moved out of the way to the forward position. The rear ramp 22 is lowered to the ground and debris is raked or swept up the ramp 22 and into the bag 12. Once sufficiently full, the switch 126 is again toggled to cause the platform 16 to be lifted to the upright position so that a person may manually compress the debris further into the bag 12 or tie and remove the bag 12 from the bag holder apparatus 10. Optionally, a shaker mechanism 134 may be attached to the platform 16 to vibrate and/or shake the platform 16 in order to assist in settling debris into the collection bag 12. An on/off switch (not shown) may be provided for example on the handle 24 or platform 16 to activate the shaker mechanism 134 which is powered by the battery 130 or other source.

It is contemplated and within the scope of this application that the invented lawn bag holder apparatus 10 may be modified to have more or less of the elements, and that the elements may be of different shapes and sizes, than that described herein and still perform an equivalent function.

Regardless of the foregoing detailed description of exemplary embodiments of the invention, the optimum dimensional relationships for the individual components of the invention, including variations in size, shape, thickness, form, materials, function and manner of operation, assembly and use, as well as equivalents thereof, are deemed to be readily apparent and understood by those skilled in the art. Accordingly, equivalent relationships to those shown in the accompanying drawing figures and described in the written description are intended to be encompassed by the invention, the foregoing being considered as illustrative only of the general concept and principles of the invention. Furthermore, since numerous modifications and changes will readily occur to those skilled in the art, the exemplary embodiments disclosed herein are not intended to limit the invention to the specific configuration, construction, materials and operation shown and described. Instead, all reasonably predictable and suitable equivalents and obvious modifications to the invention should be construed as falling within the scope of the invention as defined by the appended claims given their broadest reasonable interpretation in view of the accompanying written description and drawings.

That which is claimed is:

1. A bag holder apparatus, comprising:
   a base;
   a plurality of wheels attached to base;
   a platform pivotally attached to the base and moveable relative to the base between an upright position and a laid down position;
   a lift mechanism capable of supporting the platform in the upright position;
   a hoop attachable to the platform for holding a bag; and
   wherein the lift mechanism is adapted for moving the platform between a laid down position and an upright position, wherein the lift mechanism includes a first pneumatic cylinder having a first end portion attached to the base and a second end portion engaged with the platform.

2. The bag holder apparatus according to claim 1, wherein the first pneumatic cylinder is a multi-stage telescoping cylinder.

3. The bag holder apparatus according to claim 1, wherein the first end portion of the first pneumatic cylinder is pivotally attached to the base and the second end portion of the first pneumatic cylinder slidably engages the platform when the platform moves between the laid down position and the upright position.

4. The bag holder apparatus according to claim 1, wherein the base includes a channel and the first end portion is disposed within the channel.

5. The bag holder apparatus according to claim 4, wherein a majority of the first pneumatic cylinder is disposed within the channel when the platform is in the laid down position.

6. The bag holder apparatus according to claim 1, wherein the second end portion is disposed within a channel of the platform and the second end portion slidably engages the platform when the platform moves between the laid down position and the upright position.

7. The bag holder apparatus according to claim 6, wherein the channel has laterally opposed lips for maintaining the second end portion within the channel.

8. The bag holder apparatus according to claim 1, wherein the lift mechanism includes a second pneumatic cylinder having a first end portion attached to the base and a second end portion engaged with the platform.

9. The bag holder apparatus according to claim 8, wherein the first pneumatic cylinder has a stroke and the second pneumatic cylinder has a stoke wherein the stoke of the second pneumatic cylinder is shorter than stroke of the first pneumatic cylinder.

10. The bag holder apparatus according to claim 8, wherein the first pneumatic cylinder and/or second pneumatic cylinder is a multi-stage telescoping cylinder.

11. The bag holder apparatus according to claim 8, wherein the first end portion of the first pneumatic cylinder and the first end portion of the second pneumatic cylinder are disposed within a channel of the platform and/or the second end portion of the first pneumatic cylinder and the second end portion of the second pneumatic cylinder are slidably engaged within a channel of the platform when the platform moves between the laid down position and the upright position.

* * * * *